(12) United States Patent
English et al.

(10) Patent No.: US 11,325,341 B2
(45) Date of Patent: *May 10, 2022

(54) FABRIC WITH RETROREFLECTIVE CORE

(71) Applicant: SWNR Development, LLC, Pagosa Springs, CO (US)

(72) Inventors: Dustin English, Pagosa Springs, CO (US); Timm Smith, Pagosa Springs, CO (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,398

(22) Filed: Dec. 14, 2020

(65) Prior Publication Data
US 2021/0178723 A1 Jun. 17, 2021

Related U.S. Application Data

(60) Provisional application No. 62/947,877, filed on Dec. 13, 2019.

(51) Int. Cl.
*B32B 27/12* (2006.01)
*B32B 5/06* (2006.01)
(Continued)

(52) U.S. Cl.
CPC ............... *B32B 5/06* (2013.01); *B32B 7/12* (2013.01); *B32B 27/12* (2013.01); *D06C 23/00* (2013.01);
(Continued)

(58) Field of Classification Search
CPC ........ B32B 2260/021; B32B 2260/046; B32B 2262/0253; B32B 2262/0276; B32B 2262/0292; B32B 2307/416; B32B 2307/422; B32B 2307/51; B32B 2307/7265; B32B 2437/00; B32B 2437/02; B32B 27/08; B32B 27/12; B32B 27/285; B32B 27/30; B32B 27/322; B32B 27/36; B32B 27/40; B32B 5/06; B32B 7/12; D05B 1/26; D05D 2303/42; D06C 23/00; D06C 2700/31; D10B 2401/20

See application file for complete search history.

(56) References Cited

U.S. PATENT DOCUMENTS 2,372,632 A * 3/1945 Webb ................... A41D 27/24
428/104
8,597,760 B2 * 12/2013 Woods, II ............ D06M 17/10
428/102

(Continued)

*Primary Examiner* — Lawrence D Ferguson
(74) *Attorney, Agent, or Firm* — Conley Rose, P.C.; William H. Dietrich

(57) ABSTRACT

A stitched fabric including a retroreflective core and a yarn stitched through and forming stitch holes in the retroreflective core, where the yarn extends over at least a majority of a width and a length of the stitched fabric but still permits a portion of the retroreflective core to be visible. In some cases, the yarn and the retroreflective core are free from contact by another layer on either side of the retroreflective core. In some cases, a barrier layer is disposed over at least one side of the retroreflective core and a melted portion of the barrier layer fills a portion of the stitch holes.

17 Claims, 4 Drawing Sheets

(51) Int. Cl.
*B32B 7/12* (2006.01)
*D06C 23/00* (2006.01)

(52) U.S. Cl.
CPC ... *B32B 2260/021* (2013.01); *B32B 2260/046* (2013.01); *B32B 2262/0276* (2013.01); *B32B 2307/416* (2013.01); *B32B 2307/422* (2013.01); *B32B 2307/7265* (2013.01); *D06C 2700/31* (2013.01)

(56) References Cited

U.S. PATENT DOCUMENTS 9,028,944 B2 * 5/2015 Woods, II ............... B32B 5/06
 428/102
9,272,486 B2 * 3/2016 Lumb ..................... B32B 5/26

\* cited by examiner

FABRIC WITH RETROREFLECTIVE CORE

CROSS-REFERENCE TO RELATED APPLICATIONS

This application claims the benefit of U.S. Provisional Patent Application No. 62/947,877, filed Dec. 13, 2019, by Dustin English, et al., and titled "Fabric with Retroreflective Core," which is hereby incorporated by reference.

BACKGROUND

Cyclists, runners, road construction, law enforcement, and others all have a need to be visible to cars, particularly at night. There are two dimensions to being visible to a car. The first is being "seen," and the second is being "recognized as a person."

Being seen may be accomplished with small reflectors, lights, etc., worn by or affixed to something near the person. Being recognized as a person, however, often requires something more.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Disclosed herein is a fabric incorporating or benefiting from a retroreflective core and high visibility yarn. By constructing a fabric using these materials, an improved garment or wearable article (e.g., shirts, pants, smocks, cycling shorts, jerseys, gloves, footwear, packs, bags, etc.) for individuals in the area of motorists may be produced.

Figure 1:
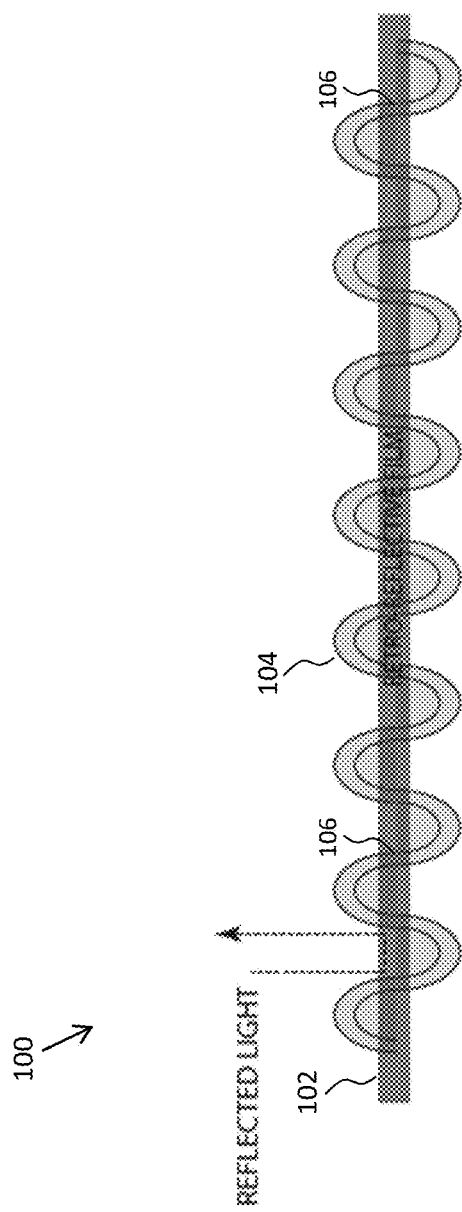
FIG. 1 is a cross section of an embodiment of a stitched fabric having a retroreflective core stitched through by a yarn.

Referring to FIG. 1, an embodiment fabric 100 is illustrated. The fabric 100 may have a variety of beneficial properties. For example, the fabric 100 reflects light and has high visibility to protect a wearer of a garment formed from the fabric 100 from failing to be seen and recognized as a person by, for example, a motorist in the dark, at dusk, and during daylight hours. As shown in FIG. 1, in an embodiment the fabric 100 includes a retroreflective core 102 and a yarn 104.

The retroreflective core 102 may be any material or fabric having a surface that reflects light back to its source (e.g., the headlights of a motor vehicle, etc.) with a minimum of scattering. In an embodiment, the retroreflective core 102 may be a material similar to SCOTCHLIGHT®, which is a retroreflective material commercially available from the 3M Company. In an embodiment, the retroreflective core 102 may be formed from one or more other known types of retroreflective materials. For example, the retroreflective core 102 may be a material similar to the retroreflective AVERY® brand vinyl, which is also commercially available from the Avery Dennison Company. The retroreflective core 102 may also be a material similar to the retroreflective tape commercially available from the Reflexite Company. Although a single layer of the retroreflective core 102 is illustrated, two or more layers may be utilized in the fabric 100.

Still referring to FIG. 1, the yarn 104 is stitched through the retroreflective core 102. In an embodiment the yarn 104 is a high visibility polyester or polyester-blend yarn. In an embodiment, materials other than polyester may be used for the yarn 104. In an embodiment, the yarn 104 is a fluorescent yarn or a yarn having fluorescent properties. The yarn 104 may be chemically or otherwise treated to resist stains, repel moisture, resist flames, or provide other beneficial properties.

As shown, the yarn 104 is stitched through more than a majority (e.g., greater than 50%) of the retroreflective core 102. In other words, the yarn 104 is stitched over a substantial portion of the length and width of the retroreflective core 102. Even so, the yarn 104 is stitched through the retroreflective core 102 in a manner that leaves a sufficient amount of the retroreflective core 102 exposed. Depending on how tightly the stitching is performed, the yarn 104 may permit more or less of the underlying retroreflective core 102 to be visible and may obscure a portion, but not all, of the underlying retroreflective core 102.

By combining a retroreflective core 102 having enough exposure (e.g., controlling the transparency via spaces between the stitched yarns 104) with high visibility (e.g., fluorescent) to form a fabric 100, any garments and/or articles made from such fabric are highly visible at night, at dusk, and during the day. As such, should a wearer of a garment or article made from the fabric 100 come into contact with a motor vehicle, the wearer is easily seen and/or recognized by the driver such that the individual can avoid being struck by the vehicle.

In an embodiment, the fabric 100 of FIG. 1. is constructed by stitching a polyester yarn 104 through the retroreflective core 102 such that the majority of the surface area of the retroreflective core 102 is covered while still leaving enough of the retroreflective core 102 visible to provide the benefits disclosed herein. During the stitching process, the yarn 104 forms stitch holes 106 through the retroreflective core 102 as shown in FIG. 1. In some circumstances, it is desirable to seal off or plug these stitch holes 106. To do so, a barrier layer 208 may be disposed over at least one side of the retroreflective core 202 as shown in the fabric 200 of FIG. 2. As will be more fully explained below, some or all of the stitch holes 206 formed by the yarn 204 are partially or fully filled when the barrier layer 208 is sufficiently heated. For example, the barrier layer 208 may be heated to a thermoplastic state, which allows a portion of the barrier layer 208 to flow and plug a portion of the stitch holes 206 in the barrier layer 208.

The barrier layer 208 is configured to inhibit fluid flow and prevents water or other liquids from reaching the retroreflective core 202. In other words, the barrier layer 208 is generally water resistant or waterproof Therefore, the barrier layer 208 functions to discourage fluid flow through the fabric 200. In addition, in an embodiment the barrier layer 208 is also windproof, yet still permits the fabric 200 to be breathable. That is, the barrier layer 208 is able to block wind from undesirably passing through the fabric 200 while still permitting moisture vapor generated by, for example, body heat to be dissipated. In an embodiment, the barrier layer 208 is stretchable or suitably elastomeric in order to compliment the degree of stretch afforded by the retroreflective core 202.

Figure 3:
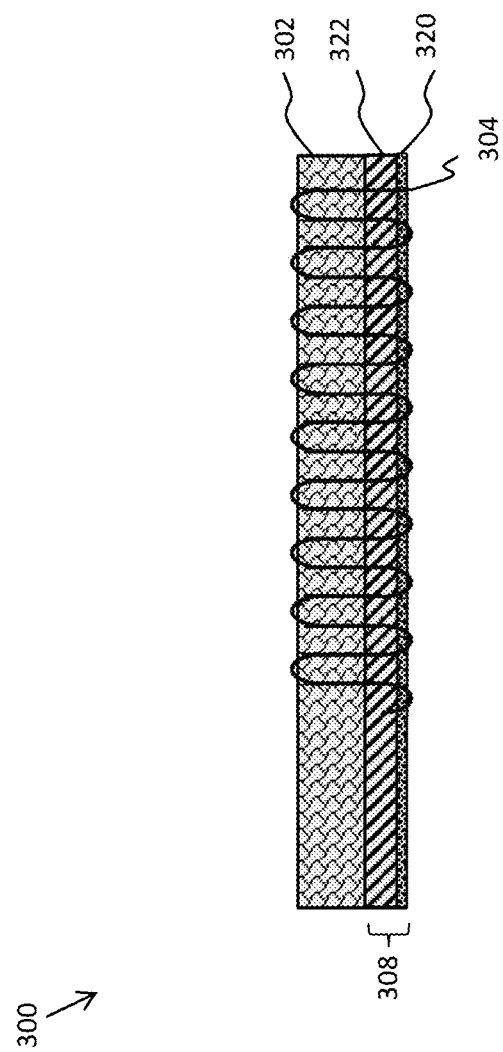
FIG. 3 is a cross section of an embodiment of a stitched fabric having a retroreflective core stitched through by a yarn and covered by a multi-component barrier layer.

In FIG. 3, a fabric 300 including a retroreflective core 302, yarn 304, and a composite barrier layer 308 is shown. In an embodiment, the barrier layer 308 comprises an adhesive 320 and an intermediate material 322 (e.g., a porous membrane or a non-porous film) as shown in FIG. 3. In an embodiment, the barrier layer 308 may include several adhesive 320 layers and/or several intermediate material 322 layers.

A melting point of the adhesive 320 is generally lower than a melting point of the intermediate material 322. Therefore, the adhesive 320 may be melted without also melting the intermediate material 322. In other words, the adhesive 320 may be forced to flow through the application of sufficient heat without flowing, or compromising the integrity of, the intermediate material 322.

In an embodiment, the melting point of the adhesive 320 may be between about 140° C. to about 180° C. (about 284° F. to about 356° F.) while the melting point of the intermediate material 322 exceeds about 180° C. (about 356° F.). Where the adhesive 320 and the intermediate material 322 have different distinct melting points as noted above, the barrier layer 308 may be referred to as having an "A-B" type format. In an embodiment, the adhesive 320 is approximately two thousandths of an inch (i.e., 2 mils) and the intermediate material 322 is approximately one thousandth of an inch (i.e., 1 mil).

In general, the adhesive 320 is a thermoplastic, copolyamide, or other suitably meltable type of material capable of bonding two layers of fabric together. A variety of different adhesives 320 may be used in the barrier layer 308. By way of example, the adhesive 320 may be a high-quality textile adhesive such a polyurethane adhesive film, an ethylene-vinyl acetate, and the like. In an embodiment, the adhesive 320 may be heat sensitive, pressure sensitive, or both.

The intermediate material 322 of the barrier layer 308 may be either a membrane or a film formed from a variety of different materials. In an embodiment, the intermediate material 322 is formed from polyurethane, polyester, urethane, polyether, polytetrafluoroethylene (PTFE), or another polymer-based material. The intermediate material 322 may be manufactured using, for example, an extrusion, a melt blowing, or an electrospinning process.

Figure 2:
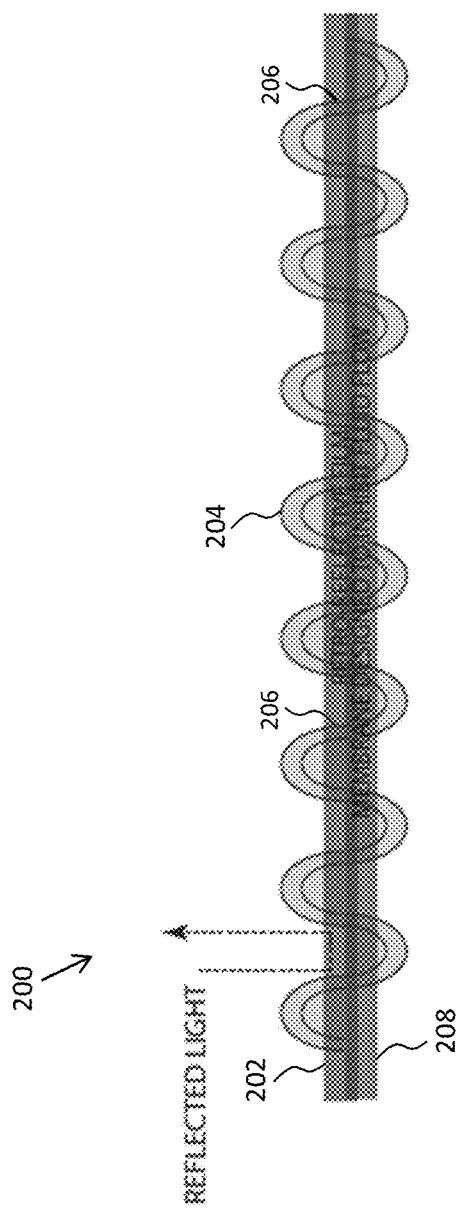
FIG. 2 is a cross section of an embodiment of a stitched fabric having a retroreflective core stitched through by a yarn and covered by a barrier layer.

As shown in FIGS. 1-3, the fabric 100, 200, 300 is free of any other layer (e.g., a face layer or an interior layer). As such, the retroreflective core 102, 202 and the yarn 104, 204 are free from contact by another layer on either side of the retroreflective core 102, 202. In an embodiment, the retroreflective core 302, the barrier layer 308, and the yarn 304 are free from contact by another layer as shown in FIG. 3. Even so, in an embodiment other layers (e.g., a face layer, an interior layer, etc.) may be added to the fabrics.

Figure 4:
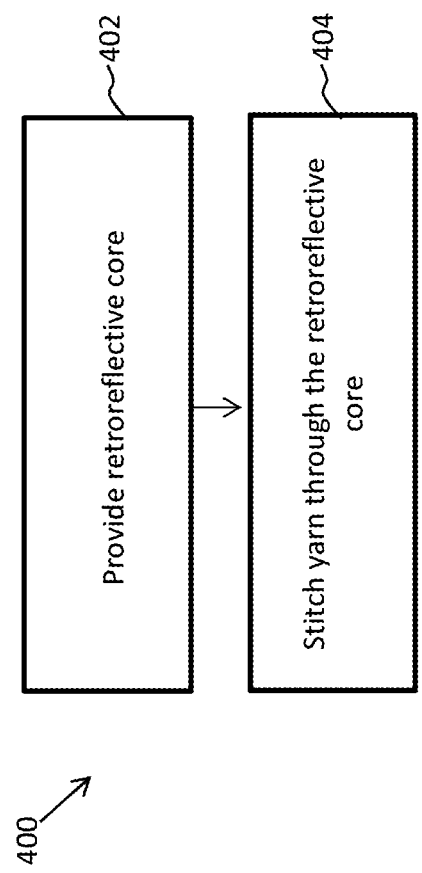
FIG. 4 is an embodiment of a method of forming the stitched fabric of FIG. 1.

In FIG. 4, a method 400 of forming the fabric 100 is illustrated. In step 402, a retroreflective core 102 is provided. In step 404, a yarn 104 is stitched through the retroreflective core 102 as described herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A stitched fabric, comprising:
a retroreflective core; and
a yarn stitched through and forming stitch holes in the retroreflective core, wherein the yarn extends over at least a majority of a width and a length of the stitched fabric, wherein a barrier layer is disposed over at least one side of the retroreflective core, and wherein a melted portion of the barrier layer fills a portion of the stitch holes.

2. The stitched fabric of claim 1, wherein the yarn and the retroreflective core are free from contact by another layer on either side of the retroreflective core.

3. The stitched fabric of claim 1, wherein the barrier layer comprises a first material with a first melting point and a second material with a second melting point, the first melting point lower than the second melting point.

4. The stitched fabric of claim 3, wherein the first material is an adhesive and the second material is a porous membrane.

5. The stitched fabric of claim 3, wherein the first material is an adhesive and the second material is a non-porous film.

6. A stitched fabric, comprising:
a retroreflective core; and
a yarn stitched through and forming stitch holes in the retroreflective core, wherein the yarn extends over at least a majority of a width and a length of the stitched fabric, and wherein the yarn is a fluorescent yarn.

7. The stitched fabric of claim 1, wherein the yarn is a fluorescent polyester yarn.

8. A method of forming a stitched fabric, comprising:
providing a retroreflective core;
stitching a yarn through, and forming stitch holes in, the retroreflective core until the yarn extends over at least a majority of a width and a length of the stitched fabric;
disposing a barrier layer over at least one side of the retroreflective core; and
applying heat to the barrier layer until a melted portion of the barrier layer fills a portion of the stitch holes.

9. The method of claim 8, wherein the yarn and the retroreflective core are free from contact by another layer on either side of the retroreflective core.

10. The method of claim 8, wherein the barrier layer comprises a first material with a first melting point and a second material with a second melting point, the first melting point lower than the second melting point.

11. A method of forming a stitched fabric, comprising:
providing a retroreflective core; and
stitching a yarn through, and forming stitch holes in, the retroreflective core until the yarn extends over at least a majority of a width and a length of the stitched fabric, wherein the yarn is a fluorescent yarn.

12. The method of claim 8, wherein the yarn is a fluorescent polyester yarn.

13. A stitched fabric, comprising:
   a retroreflective core;
   a fluorescent yarn stitched through and forming stitch holes in the retroreflective core; and
   a barrier layer disposed over one side of the retroreflective core, wherein a melted portion of the barrier layer fills a portion of the stitch holes.

14. The stitched fabric of claim 13, wherein the fluorescent yarn extends over more than a majority of a width and a length of the stitched fabric.

15. The stitched fabric of claim 13, wherein the fluorescent yarn is at least partially formed from polyester.

16. The stitched fabric of claim 13, wherein the barrier layer is configured to inhibit fluid flow.

17. The stitched fabric of claim 13, wherein the barrier layer prevents water or other liquids from reaching the retroreflective core.

\* \* \* \* \*